(12) United States Patent
Buckl et al.

(10) Patent No.: US 9,277,031 B2
(45) Date of Patent: Mar. 1, 2016

(54) METHOD FOR COMMUNICATING BETWEEN A NUMBER OF FIRST SERVICES AND A NUMBER OF SECOND SERVICES

(75) Inventors: Christian Buckl, Wangen (DE); Jörg Heuer, Oberhaching (DE); Anton Schmitt, Vaterstetten (DE); Andreas Scholz, Unterschleißheim (DE); Martin Winter, Rosenheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 81 days.

(21) Appl. No.: 13/320,309

(22) PCT Filed: Apr. 29, 2010

(86) PCT No.: PCT/EP2010/055816
§ 371 (c)(1),
(2), (4) Date: Nov. 14, 2011

(87) PCT Pub. No.: WO2010/130585
PCT Pub. Date: Nov. 18, 2010

(65) Prior Publication Data
US 2012/0059868 A1 Mar. 8, 2012

(30) Foreign Application Priority Data
May 12, 2009 (DE) .......................... 10 2009 020 929

(51) Int. Cl.
*G06F 15/16* (2006.01)
*H04L 29/06* (2006.01)
*H04L 29/08* (2006.01)

(52) U.S. Cl.
CPC ................. *H04L 69/08* (2013.01); *H04L 67/12* (2013.01); *H04L 67/2842* (2013.01)

(58) Field of Classification Search
None
See application file for complete search history.

(56) References Cited

U.S. PATENT DOCUMENTS

| 6,801,528 B2 | 10/2004 | Nassar | 370/389 |
| 6,909,899 B2 | 6/2005 | Wang et al. | 455/436 |

(Continued)

FOREIGN PATENT DOCUMENTS

| CN | 1604532 A | 4/2005 | G06F 15/173 |
| CN | 1679302 A | 10/2005 | H04L 29/06 |

(Continued)

OTHER PUBLICATIONS

Sá de Souza, et al. Mar. 2008, "SOCRADES: a web service based shop floor integration infrastructure," IOT'08 Proceedings of the 1st international conference on the Internet of things, pp. 50-67.*

(Continued)

*Primary Examiner* — Kaveh Abrishamkar
(74) *Attorney, Agent, or Firm* — Slayden Grubert Beard PLLC

(57) ABSTRACT

In a method for communicating between a number of first services and a number of second services. The number of first services belongs to a service-oriented architecture, in which a respective first service is provided by messages based on a question-answer mechanism by a first protocol. The number of second services belongs to a data-based architecture, in which second services can be switched together by a second protocol. The second protocol specifies data input and data output of the second service and transfers the data between the second services. A message of a first service, entering into the service converter, is converted into data input of a second service associated with the first service and/or data output of a second service, entering into the service converter is converted into a message emitted by the service converter, of a first service associated with the second service.

27 Claims, 7 Drawing Sheets

(56) References Cited

U.S. PATENT DOCUMENTS

| | | | |
|---|---|---|---|
| 7,574,524 B2 | 8/2009 | Bantz et al. | 709/238 |
| 7,580,704 B2 | 8/2009 | Narita | 455/416 |
| 2005/0080811 A1 | 4/2005 | Speeter et al. | |
| 2006/0161895 A1 | 7/2006 | Speeter et al. | 717/121 |
| 2006/0179116 A1 | 8/2006 | Speeter et al. | 709/217 |
| 2007/0233881 A1 | 10/2007 | Nochta et al. | 709/228 |
| 2008/0033765 A1 | 2/2008 | Knight et al. | 705/10 |
| 2008/0279155 A1 | 11/2008 | Pratt, Jr. et al. | 370/336 |
| 2009/0006522 A1* | 1/2009 | Kim et al. | 709/201 |
| 2009/0010204 A1 | 1/2009 | Pratt, Jr. et al. | 370/328 |
| 2009/0010205 A1 | 1/2009 | Pratt, Jr. et al. | 370/328 |
| 2009/0046675 A1 | 2/2009 | Pratt, Jr. et al. | 370/337 |
| 2009/0046732 A1 | 2/2009 | Pratt, Jr. et al. | 370/406 |
| 2009/0052429 A1 | 2/2009 | Pratt, Jr. et al. | 370/350 |
| 2009/0059814 A1 | 3/2009 | Nixon et al. | 370/254 |
| 2009/0276451 A1* | 11/2009 | Shelby et al. | 707/101 |
| 2011/0178611 A1 | 7/2011 | Daraiseh et al. | 700/80 |
| 2011/0216656 A1 | 9/2011 | Pratt, Jr. et al. | 370/241 |
| 2011/0302635 A1 | 12/2011 | Pratt, Jr. et al. | 726/4 |
| 2012/0124554 A1* | 5/2012 | Tam | 717/121 |

FOREIGN PATENT DOCUMENTS

| | | | |
|---|---|---|---|
| CN | 1829155 A | 9/2006 | H04L 12/00 |
| CN | 101136877 A | 3/2008 | H04L 12/58 |
| EP | 1892656 | 2/2008 | G06Q 10/00 |

OTHER PUBLICATIONS

D. Savio and S. Kamouskos, "Web-service enabled wireless sensors in SOA environments," in International Conference on Emerging Technologies and Factory Automation (ETFA). IEEE, 2008, pp. 952-958.*

Leguay, J., LopezRamos, M., JeanMarie, K., and Conan, V., "An Efficient Service Oriented Architecture for Heterogeneous and Dynamic Wireless Sensor Networks," 33rd IEEE Conference on Local Computer Networks, Oct. 2008 (attached to the instant office action as Leguay_2008.pdf).*

Kim, et al., "When HART Goes Wireless: Understanding and Implementing the WirelessHart Standard", Emerging Technologies Technologies and Factory Automation, IEEE Int'l Conference ON, IEEE Piscataway, NJ; pp. 899-907, Sep. 15, 2008.

Rezgui, et al., "Service-Oriented Sensor-Actuator Networks: Promises, Challeges, and the Road Ahead", Science Direct, Computer Communications; pp. 2627-2648, Jun. 26, 2007.

Sanchez, et al., "Bandwidth-Efficient Geographic Multicast Routing Protocol for Wireless Sensor Networks", Sensors Journal, IEEE, vol. 7, issue 5; pp. 627-636, May 2007.

Wang, et al., "Service Composition in Service-Oriented Wireless Sensor Networks with Persistent Queries", Consumer Communications and Networking Conference, CCNC.6th IEEE, 5 pages, Jan. 15, 2010.

International Search Report and Written Opinion, PCT/EP2010/053992, 18 pages, Aug. 31, 2010.

German Office Action, German Patent Application No. 10 2009 021 007 5-31, 5 pages, Jan. 15, 2010.

Machado, et al., "Integration of Embedded Devices through Web Services: Requirements, Challenges and Early Results". Proceedings of the 11th IEEE Symposium on Computers and Communications, pp. 353-358, Jun. 26, 2006.

Moreira Sa de Souza, et al., "Socrades: A Web Service Based Shop Floor Integration Infastructure", The Internet of Things—Lecture Notes in Computer Science; Springer Berlin Heidelberg XP019087711, pp. 50-67, Mar. 26, 2008.

Lombriser, et al., "Modeling Service-Oriented Context Processing in Dynamic Body Area Networks", IEEE Journal on Selected Areas in Communications, vol. 27, No. 1; pp. 49-57, Jan. 1, 2009.

Candido, et al., "SOA in Reconfigurable Supply Chains: A Research Roadmap", Engineering Applications of Artificial Intellectual, vol. 22, No. 6; pp. 939-949, Jan. 30, 2009.

Evensen, et al., "Sensor Virtualization with Self-Configuration and Flexible Interactions", ACM International Conference Proceeding Series—The 3rd ACM International Workshop on Context-Awareness for Self-Managing System, 2009 Association for Computing Machinery USA; XP002602223; pp. 31-38, May 11, 2009.

International PCT Search Report and Written Opinion, PCT/EP2010/055816, 13 pages, Oct. 14, 2010.

Chinese Office Action, Application No. 201080020780.6, 6 pages, Oct. 10, 2013.

* cited by examiner

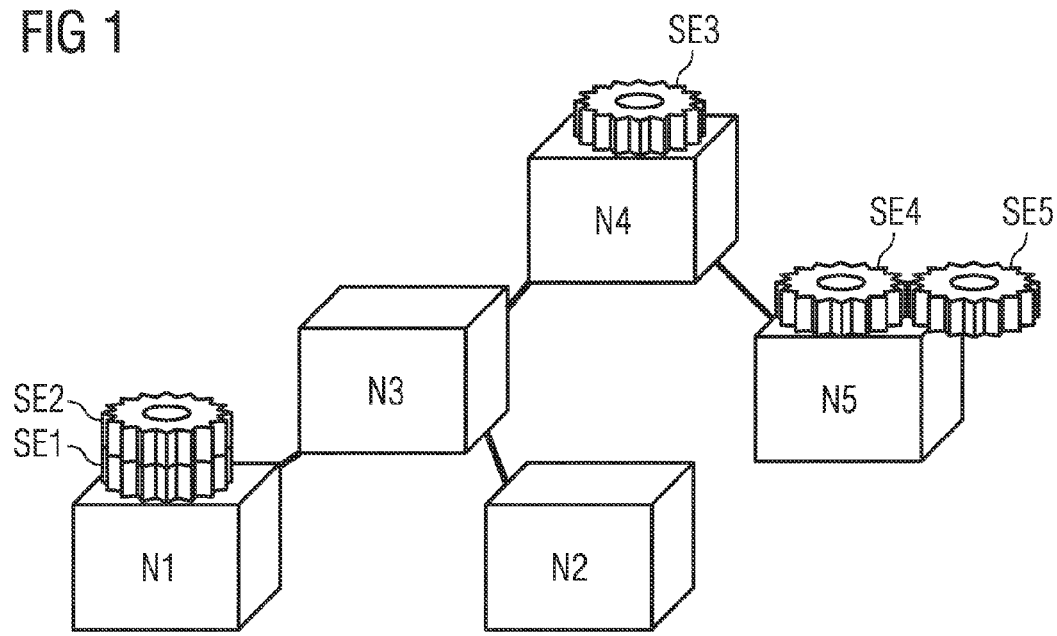
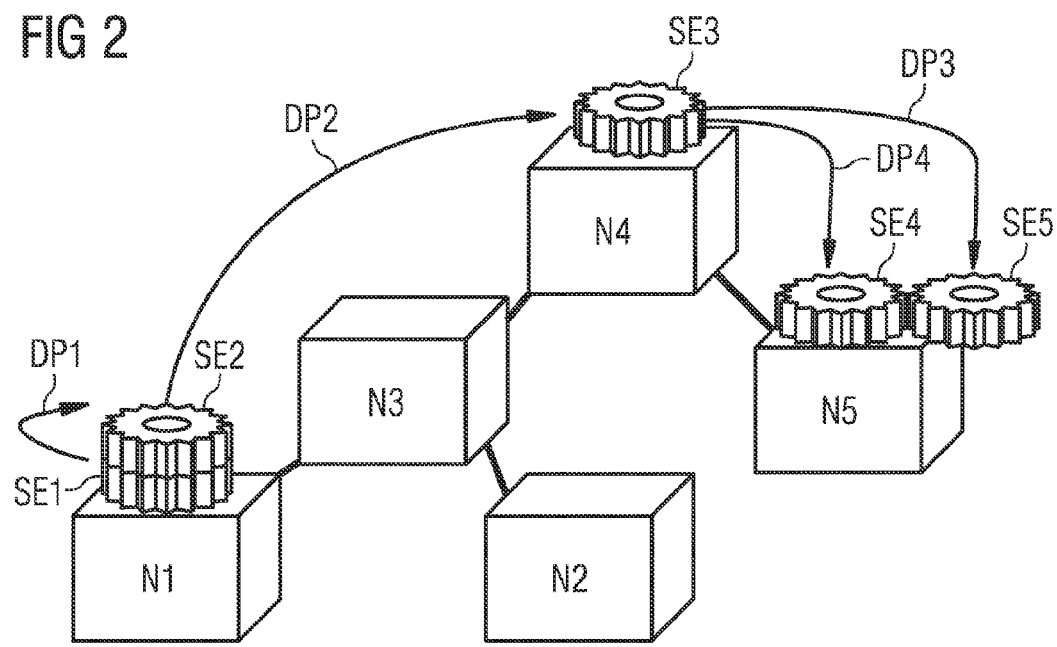

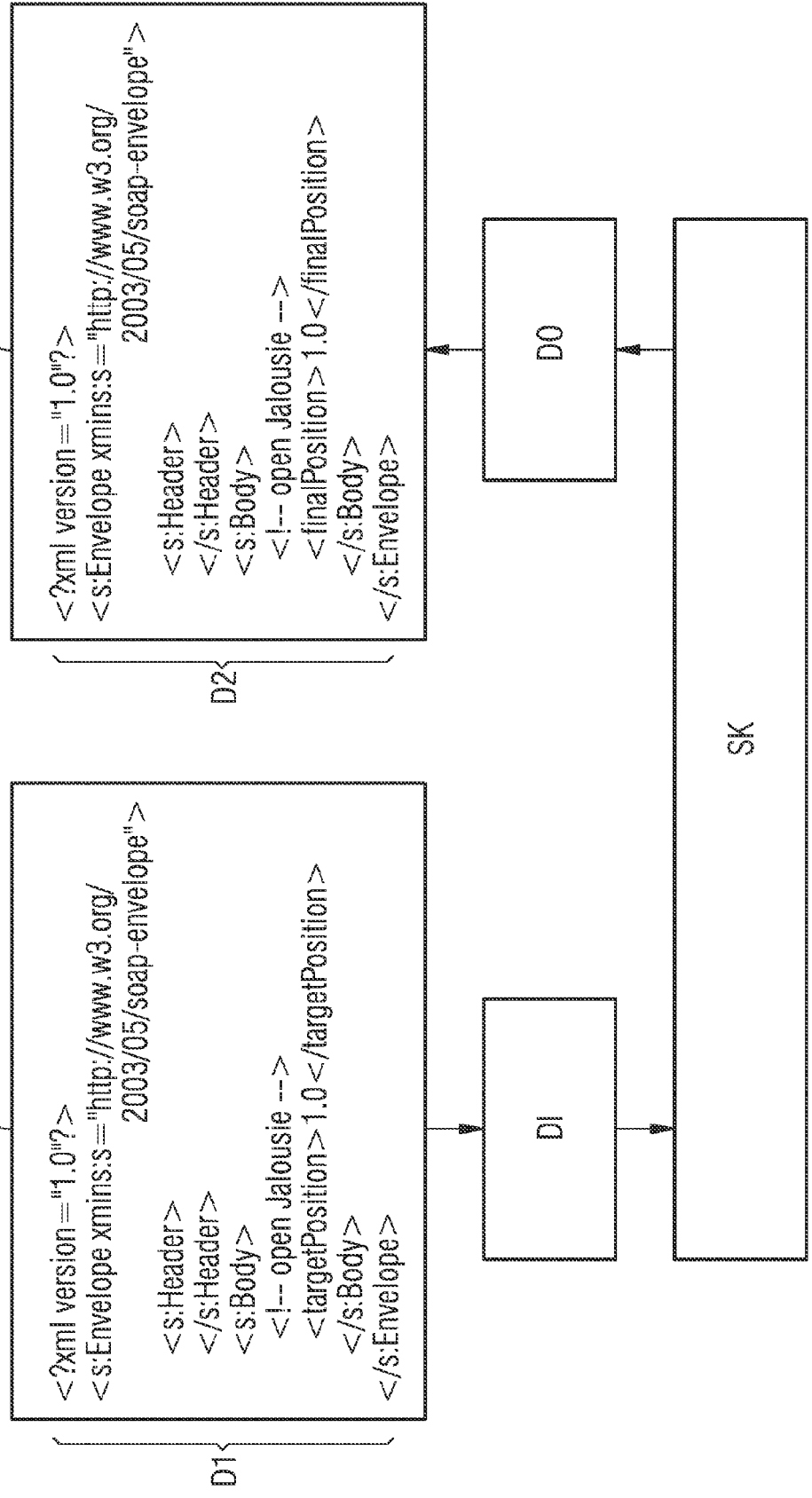

ମETHOD FOR COMMUNICATING BETWEEN A NUMBER OF FIRST SERVICES AND A NUMBER OF SECOND SERVICES

CROSS-REFERENCE TO RELATED APPLICATIONS

This application is a U.S. National Stage Application of International Application No. PCT/EP2010/055816 filed Apr. 29, 2010, which designates the United States of America, and claims priority to German Application No. 10 2009 020 929.8 filed May 12, 2009. The contents of which are hereby incorporated by reference in their entirety.

TECHNICAL FIELD

The invention relates to a method for communicating between a number of first services and a number of second services.

BACKGROUND

Various architectures for executing services in data networks or in internetworked electronic units are known from the prior art. In particular, there are so-called service-oriented architectures in which a service may be called up via a request and the information provided by the service then output via a corresponding response. An example of services in service-oriented architectures are the web services known from the World Wide Web.

In contrast to this, data processing may also be carried out by services in a data-driven architecture, which is used, for example, in so-called embedded networks, whereby an input with a corresponding data input and an output with a corresponding data output are specified for a service, wherein a data input generates a corresponding data output. A number of services may thus be interconnected into a chain of services, wherein—with the aid of a suitable protocol—the corresponding data inputs and data outputs of the services and the forwarding of data between the services may be defined. These service chains may be easily modified without the services themselves needing to be adjusted. In this way a flexible and rapidly implementable adjustment of service chains may be achieved in a data-driven architecture.

Nowadays the various service architectures are used alongside one another and there is as yet no interface which converts the services of one architecture into corresponding services of the other architecture.

SUMMARY

According to various embodiments, a method for communicating between a number of first services and a number of second services can be created, whereby the various service architectures are able to communicate with one another.

According to an embodiment, in a method for communicating between a number of first services and a number of second services, wherein the number of first services belongs to a service-oriented architecture, in which a respective first service is provided via notifications based on a request-response mechanism by means of a first protocol, and wherein the number of second services belongs to a data-driven architecture, in which second services can be interconnected by means of a second protocol, wherein the second protocol specifies data inputs and data outputs of the second services and the forwarding of data between the second services, a notification of a first service incoming into a service converter is converted into a data input of a second service associated with the first service and/or a data output of a second service incoming into the service converter is converted into a notification outgoing from the service converter, of a first service associated with the second service.

According to a further embodiment, the number of first services may comprise one or more web services. According to a further embodiment, the number of second services in a network can be distributed services, wherein at least some of the services in the network are interconnected by means of one or more service chains specified via the second protocol. According to a further embodiment, a notification of a first service incoming into the service converter in the form of a request notification to the first service can be converted into a data input of a second service, which is associated with the first service, and then a data output of the second service or of a further second service, which is also associated with the first service and is interconnected with the second service, is converted into a notification of the first service outgoing from the service converter in the form of a response notification to the request notification. According to a further embodiment, one or more data outputs of one or more second services can be stored in a cache and provided via the cache to the service converter, wherein the data output or outputs are preferably periodically generated. According to a further embodiment, the cache can be implemented as a second service in which data outputs cached via data inputs may be called. According to a further embodiment, a first service can be specified in the service converter in a description language for first services, in particular in a WSDL document, said document being processed in the service converter such that one or more data inputs from one or more second services are generated from one or more of the request notifications to the first service specified in the document, and one or more response notifications of the first service, specified in the document are generated from one or more data outputs of one or more second services. According to a further embodiment, a data output of a second service incoming into the service converter can be converted into a notification of a first service associated with the second service outgoing from the service converter in the form of a request notification to the first service. According to a further embodiment, the incoming response notification from the first service to the request notification can be converted by the service converter into a data input of the second service. According to a further embodiment, a first service subscribes to predefined data outputs of a second service, wherein a predefined data output of the second service incoming into the service converter can be converted into a notification of the first service outgoing from the service converter. According to a further embodiment, a notification of a first service, incoming into the service converter in the form of a response notification of the first service, which was sent in response to a request notification previously output to the first service by the service converter, can be converted into a data input of a second service associated with the first service. According to a further embodiment, the service converter may subscribe to predefined notifications of a first service, wherein a predefined notification of the first service incoming into the service converter is converted in the service converter into a data input of a second service associated with the first service. According to a further embodiment, at least some of the first and/or second services can be implemented in the service converter.

According to another embodiment, a service converter for communication between a number of first services and a number of second services, wherein the number of first services belongs to a service-oriented architecture, in which a respective first service is provided via notifications based on a request-response mechanism by means of a first protocol, and wherein the number of second services belongs to a data-driven architecture, in which second services can be interconnected by means of a second protocol, wherein the second protocol specifies data inputs and data outputs of the second services and the forwarding of data between the second services, may comprise: a first conversion means for converting a notification of a first service incoming into the service converter into a data input of a second service associated with the first service and/or a second conversion means for converting a data output of a second service incoming into the service converter into a notification of a first service associated with the second service outgoing from the service converter.

According to a further embodiment, the service converter may be designed such that a method as described above can be implemented with the service converter.

BRIEF DESCRIPTION OF THE DRAWINGS

Exemplary embodiments are described in detail below on the basis of the attached drawings, wherein FIG. 1 shows a network comprising a plurality of network nodes in which second services are embedded;

FIG. 2 shows the network in FIG. 1, which shows the embodiment of embedded services based on a variant of a second protocol;

FIG. 10 is a schematic illustration of an embodiment in which a first service is implemented on the service converter via a WSDL document; and FIG. 11 is a schematic illustration which clarifies the conversion of notifications according to the first protocol into data inputs or data outputs according to the second protocol.

DETAILED DESCRIPTION

Figure 3:
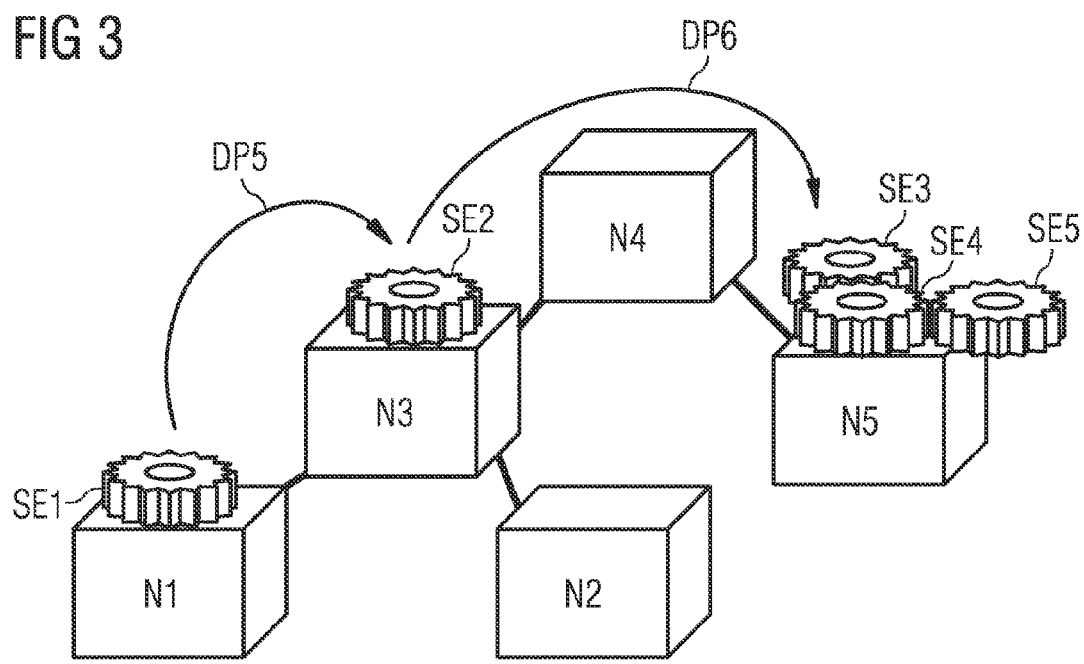
FIG. 3 shows the network in FIG. 1, which reflects a dynamic repositioning of the embedded services.

The method according to various embodiments is used for communication between a number of first services and a number of second services, the number of first services belonging to a service-oriented architecture in which a respective first service is provided via notifications based on a request-response mechanism by means of a first protocol, and the number of second services belonging to a data-driven architecture, in which the second services can be interconnected by means of a second protocol, wherein said second protocol specifies data inputs and data outputs of the second service and the forwarding of data between the second services. The term "request-response mechanism" is therefore to be broadly understood and includes not only the receipt of a request immediately followed by the output of a response, but also possibly subscriptions according to which corresponding notifications of a first service are output on the basis of the subscription. In this sense a request is then represented by a subscription, which generates corresponding responses in the form of notifications. Data input or data output means the receipt of data at an input of the service or the emission of data from an output of the service. In particular the second protocol specifies, for a data input or data output, a corresponding notification which contains the input or output data and specifies whether it relates to a data input or a data output. The notification further contains a designator or identifier for the service on which the data input or data output takes place.

In the method according to various embodiments a notification of a first service, incoming into a service converter, is converted into a data input of a second service associated with the first service and/or a data output of a second service incoming into the service converter is converted into a notification, outgoing from the service converter, of a first service associated with the second service. The association according to various embodiments of outgoing or incoming notifications of a first service of a service-oriented architecture to corresponding data inputs or data outputs of a second service of a data-driven architecture is achieved by the simple means of communication between the service-oriented architecture and the data-driven architecture, so that second services can also be used by first services or vice versa.

In an embodiment the number of first services comprises one or more web services, which are sufficiently known from the prior art. The SOAP protocol (SOAP=Simple Object Access Protocol), which is likewise known from the prior art, is preferably used as the first protocol for the notifications of the first services. The second services are preferably services distributed in a network, said network in particular being a so-called embedded network. Embedded networks are sufficiently known from the prior art and enable services to be embedded in suitable network nodes, which may—for example—constitute sensors, actuators or other electronic units. At least some of these second services are interconnected in the network by means of one or more service chains specified via the second protocol.

In an embodiment of the method, a notification of a first service incoming into the service converter in the form of a request notification to the first service is converted into a data input of a second service, which is associated with the first service, and a data output of the second service or of a further second service, which is likewise associated with the first service and interconnected with the second service, is then converted into a notification of the first service outgoing from the service converter in the form of a response notification to the request notification. This first service is preferably a service implemented in the service converter. With this variant of the method a second service or chain of second services can be efficiently called from a first service with the help of the service converter.

In a further embodiment of the method, one or more data outputs of one or more second services are stored in a cache and provided via the cache to the service converter, wherein the data output or outputs are preferably periodically generated. With this variant it is possible for data outputs of second services to be called via a first service, without it being necessary for the data outputs to be triggered via an event. In an embodiment this cache is implemented as a separate second service, in which it is possible—via data inputs, for example via data inputs which constitute converted request notifications to a first service—for buffered data outputs to be called, which are preferably data outputs that are converted into corresponding response notifications of a first service.

In a further embodiment of the method, a first service is specified in the service converter by a document in a description language for first services, in particular by a WSDL document (WSDL=Web Service Description Language), said document being processed in the service converter such that one or more data inputs of one or more second services are generated from one or more request notifications to the first service, that are specified in the document, and one or more response notifications from the first service, that are specified in the document, are generated from one or more data outputs from one or more second services.

In a further embodiment of the method a data output of a second service incoming into the service converter is converted into a notification, outgoing from the service converter, of a first service associated with the second service, in the form of a request notification to the first service. In this way a first service can be addressed via a data output of a second service, wherein the response notification from the first service incoming in response to the request notification is preferably converted by the service converter into a data input of the second service.

In a further embodiment of the method, a first service subscribes to predefined data outputs of a second service, wherein a predefined data output of the second service incoming into the service converter is converted in the service converter into a notification of the first service outgoing from the service converter. These predefined data outputs are in particular periodic data outputs. According to this variant of the method, a first service can call data outputs of a second service by simple means.

In a further embodiment of the method, a notification of a first service incoming into the service converter in the form of a response notification of the first service, which was sent to the first service in response to a request notification previously output from the service converter, is converted into a data input of a second service associated with the first service. In this way data from a first service can be called via a second service in an appropriate manner.

In a further embodiment of the method, the service converter subscribes to predefined notifications of a first service, wherein a predefined notification of the first service incoming into the service converter is converted into a data input of a second service associated with the first service, the notifications incoming into the service converter preferably being generated periodically. According to this variant it is possible for data of a first service to be provided to a second service by simple means via a subscription mechanism.

In a further embodiment of the method, at least some of the first and/or second services are implemented in the service converter. In particular, the second services can be implemented as virtual services, via which incoming notifications of first services are converted into corresponding data inputs of second services or data outputs of second services are converted into outgoing notifications of first services.

According to a further embodiment, in a service converter for communication between a number of first services and a number of second services, the number of first services belongs to a service-oriented architecture in which a respective service is provided via notifications based on a request-response mechanism by means of a first protocol, and wherein the number of second services belongs to a data-driven architecture, in which the second services can be interconnected by means of a second protocol, wherein the second protocol specifies data inputs and data outputs of the second services and the forwarding of data between the second services.

The service converter here comprises a first conversion means for converting a notification of a first service incoming into the service converter into a data input of a second service associated with the first service and/or a second conversion means for converting a data output of a second service incoming into the service converter into a notification, outgoing from the service converter, of a first service associated with the second service.

The service converter is preferably configured such that one or more of the exemplary embodiments of the method described above can be implemented with the service converter.

Before the communication between first and second services according to various embodiments is explained, data-driven services in the form of embedded services in a network comprising a plurality of network nodes are described on the basis of FIG. 1 to FIG. 3. According to FIG. 1 this network comprises network nodes N1, N2, N3, N4 and N5, which may constitute various types of devices that can communicate with one another using wireless and/or wired connections. In particular, the network nodes may constitute sensors, actuators, pure processor units and a combination of these devices. On some of the nodes, second services are implemented which are indicated by gearwheels with reference labels SE1, SE2, SE3, SE4 and SE5. In this way a majority of second services are distributed in the network, wherein these second services can communicate with one another and can be interconnected via a second protocol. This second protocol is based on a data-driven communication in the network shown in FIG. 1. In this communication the receipt of an item of data may initiate the processing stage of data forwarding. This type of data processing is used since it is associated with minimal delays and communication effort between the network nodes of the network.

The communication between the individual second services according to the second protocol takes place in such a way that a data input and a data output is specified for each service and, via the protocol for a data output of a respective second service, the services to which the data output as corresponding data inputs is to be forwarded, are defined. In this way services are interconnected externally via the second protocol, wherein the knowledge about the forwarding of data between the services via appropriately specified data paths between the services is defined. The individual services do not know to which service their data output is forwarded or from which service they receive a data input. This knowledge is specified by the second protocol on the basis of a middleware. This achieves the advantage that the chain of services can be changed in an appropriate manner by the adjustment, by means of the second protocol, of specified data paths without modification of services.

Based on a specification of the chain of second services via the second protocol, different optimizations may be implemented in the transfer of data between the individual services. In particular, optimized data paths can be implemented in the network with minimally small quantities of transferred data. For example, if a data value is used by more than one service, an optimized data path is determined such that, where possible, a data packet is transferred only once in the direction of the destination and the distribution to a plurality of data packets on different receiving nodes takes place at optimized points, e.g. as late as possible. For this purpose the structures of the various applications implemented via distributed structures are gathered at one or more central points in the network, where they are investigated for potential data path overlaps, and optimized. On the basis of the results of this analysis, forwarding rules are determined which specify one or more services or nodes for the forwarding based on a corresponding source address of the service. Thus source addresses that do not specify the transmitting network nodes, but identify the transmitting service are used in the method. In addition, an identifier of the data content or its type can also be used for the source addressing.

FIG. 2 illustrates the optimization just described above, wherein—according to a first application—a service chain outgoing from service SE1 to service SE4 is implemented and, by means of a second application, a service chain outgoing from service SE1 to service SE5. According to an optimization the data is transferred between the services firstly via the common data paths DP1 and DP2 and only distributed into the data paths DP3 and DP4 in the service SE3, whereby the data for service SE5 is sent according to data path SE3 and the data for service SE4 is sent according to data path DP4.

In an embodiment of an optimization of the data transfer, notifications are forwarded between the network nodes in such a way that as extensive a combination of transmission paths as possible is implemented for a notification to a plurality of recipients based on the identification of the notification with the source address and on an association of the source address with receiving nodes or services. This leads to a reduction in the number of forwarding rules on the common transmission path.

In a further variant of an optimization, on the basis of the second protocol services distributed in the network are repositioned so that the services are moved dynamically from one network node to another and for this purpose additionally required forwarding rules based on the source addresses in the network are installed only on the new data paths. This variant is illustrated in FIG. 3, which shows that—unlike in FIG. 1 and FIG. 2—the service SE2, which was originally on node N1, is now on node N3 and the service SE3, which was previously on node N4, is now on node N5. An application over a link from service SE1 to service SE3 via service SE2 is indicated here by the data paths DP5 and DP6.

By avoiding any redundant overlapping of data based on the optimization described above, considerable savings in bandwidth can be achieved for communication in networks with complex distributed applications. Particularly in the case of wireless network nodes with battery power supply, this also means a considerable reduction in energy consumption and therefore a longer battery life in many cases. For the services, there is furthermore the advantage that they do not have to explicitly know and administer their communication partner. The entire communication structure is mapped in the forwarding rules which are implemented outside the services using a second protocol, wherein this second protocol administers the services via corresponding identifiers and specifies data paths between the individual services.

Figure 4:
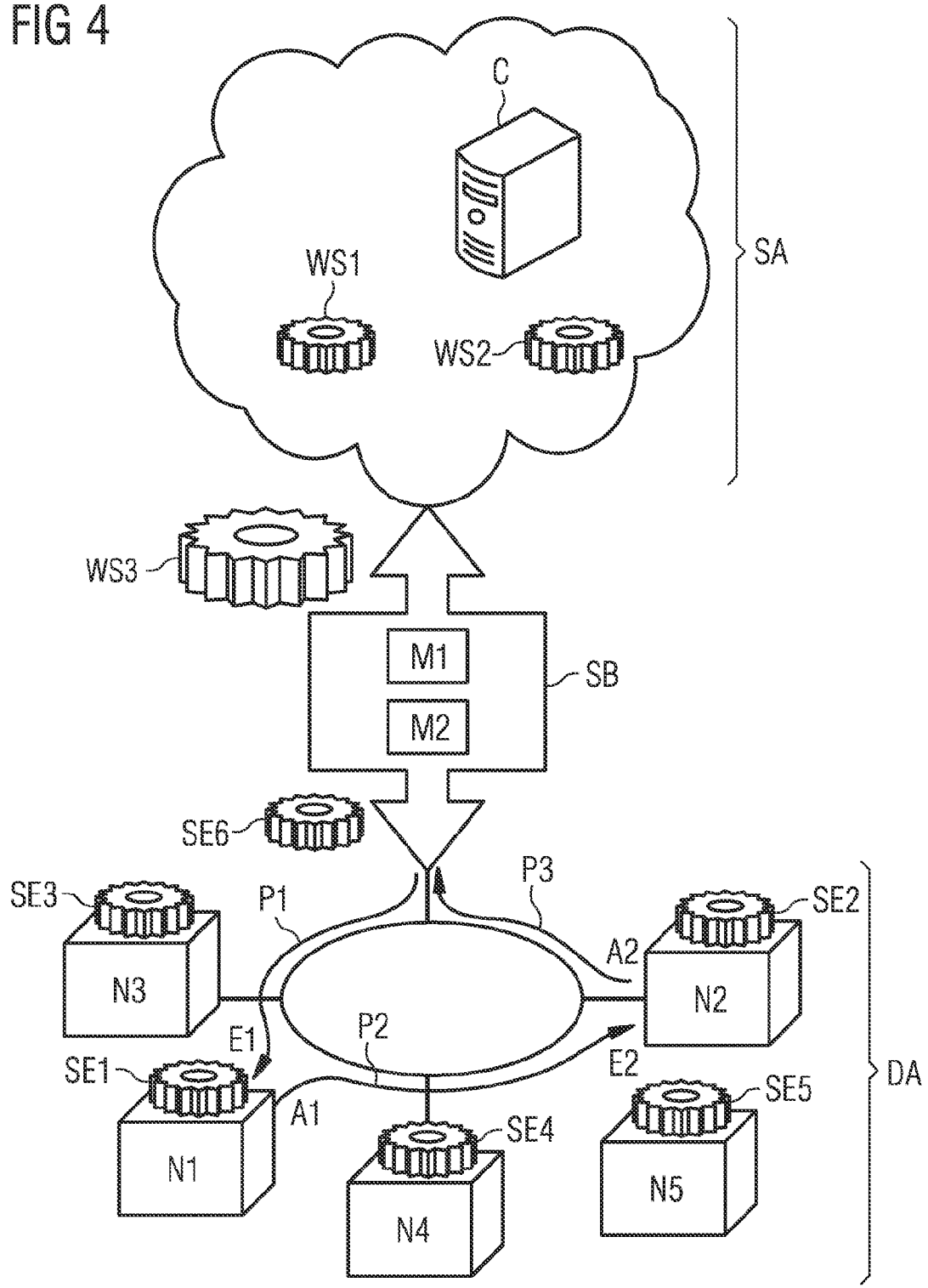
FIG. 4 is a schematic illustration of a communication between first and second services by means of a service converter according to an embodiment.

FIG. 4 is a schematic diagram illustrating an embodiment of the method, on the basis of which the second services described—for example on the basis of FIG. 1 to FIG. 3—of a data-driven architecture can communicate with first services based on a service-oriented architecture (SOA) that is known per se. The data-driven architecture DA is indicated in the lower part of FIG. 4 and the service-oriented architecture SA in the upper part of FIG. 4. Network nodes in the data-driven architecture are in turn designated with corresponding reference labels N1, N2, N3, N4 and N5. Second services in the form of embedded services are likewise designated with corresponding reference labels SE1, SE2, SE3, SE4, SE5 and SE6. In contrast, first services in the service-oriented architecture SA are designated with WS1, WS2 and WS3, these first services being implemented in the form of web services that are known per se in the embodiment shown in FIG. 4. Furthermore, a client processor in the service-oriented architecture SA is labeled with C. Corresponding web services can be called via this processor. The service-oriented architecture SA and the data-driven architecture DA are linked together via a service converter in the form of a service bridge SB, wherein web services or second services may be implemented on the service bridge itself. In FIG. 4 the web service WS3 and the second service SE6 are services which are installed on the service bridge SB.

Communication with a web service in the service-oriented architecture SA is based on a request-response mechanism, according to which a request can be sent by a client to a web service, whereupon the request is answered by an appropriate response. These requests and responses constitute notifications according to a protocol of the service-oriented architecture. In an embodiment these notifications are so-called SOAP (Simple Object Access Protocol) notifications, which are sufficiently known from the prior art. The service bridge contains two modules M1 and M2, wherein module M1 is used for converting an incoming notification SA from the service-oriented architecture into a corresponding data input to an embedded service of the data-driven architecture DA. In contrast, module M2 is used for converting an incoming data output of a corresponding embedded service from the data-driven architecture DA into a suitable notification of the service-oriented architecture SA. Inputs E1 and E2 of the services SE1 and SE2 and outputs A1 and A2 of the services SE1 and SE2 are furthermore indicated in FIG. 4, in which—by way of example—a data input on input E1 is further indicated with an arrow P1, a data transfer from output A1 to input E2 is further indicated with the arrow P2, and a data output on output A2 is further indicated with the arrow P3.

Four variants a) to d) of implementations of the method based on a communication via the service bridge SB are described below.

In variant a) the client C makes a web-service request to one of the web services of the service-oriented architecture SA. This web service request is linked with a data input on the input E1 of the first embedded service SE1. The service bridge SB forwards this request to the input E1 of the addressed embedded service SE1, by generating from the request a corresponding data input according to the second protocol of the data-driven architecture. In one variant a1) the data output on the output A1 of the embedded service SE1 matches a corresponding response of the web service addressed in the service-oriented architecture. In this case the service bridge immediately generates a response depending on the data output on output A1 of the embedded service SE1 and sends it to the client C via the web service addressed by the request. In a further variant a2) the response to be sent via the web service addressed by the client C is linked with the data output on the output A2 of the second embedded service SE2. In this case the service bridge SB returns the corresponding response to the requesting client C, as soon as the outgoing item of data on output A2 of the second embedded service SE2 reaches the embedded services according to a chain and is transferred from there to the service bridge. In this way a distributed embodiment of embedded services of the data-driven architecture DA is mapped onto a web service of the service-oriented architecture.

In a second variant b) web services can be called via the service bridge SB and implemented by service chains, so that status information or output signals of the embedded services are continuously buffered on the service bridge. For this purpose, a suitable cache is used which is installed in the service bridge or is associated with it. A client C in turn makes a request to a web service of the service-oriented architecture. This request is in turn linked with the input E1 of the first embedded service SE1 and an output A2 of the second embedded service SE2. A chain of services is thereby in turn implemented in the data-driven architecture. The service bridge SB responds to the request sent from the client with output values of the second embedded service, wherein these output values are buffered in the cache.

In a third variant c) the service bridge SB is configured as part of a service chain within the data-driven architecture DA, wherein the output A1 of the first service SE1 is connected with the service bridge which forwards the output signal as a request to a web service of the service-oriented architecture. Furthermore the service bridge SB may be connected with the input E2 of the second embedded service SE2, so that the response of the specified web service is forwarded to this input. Thus with this variant a web service from the service-oriented architecture is made available in the data-driven architecture.

In the fourth variant d) the service bridge SB is in turn configured as part of a service chain, whereby the service bridge SB is connected with the input E1 of the embedded service SE1, so that response notifications of a web service of the service-oriented architecture SA are forwarded to this input. Furthermore the service bridge for the service chain is configured so that it issues certain web service requests, so that the web service responses are forwarded to the input of the embedded service E1. As a result of this a web service is made available in the data-driven architecture DA through the service bridge.

The embedded services accessible via the service bridge SB may be identified and addressed, for example by means of a URI (URI=Universal Resource Indicator). In an embodiment this URI directly represents the address of the corresponding embedded service. In a further variant the URI may also address a service of the service bridge, which in turn addresses the desired embedded service via information contained in the request.

Cases a) and b) described above may also be combined in an embodiment, so that a web service request from the service-oriented architecture is answered with a value buffered in the service bridge. In a further embodiment the web service notifications in the service-oriented architecture are based on textual XML notifications, whereas the data inputs or data outputs in the data-driven architecture contain binary XML notifications, wherein it is further specified in the corresponding notification of the second protocol whether the notification is a data input or a data output, and to which second service it belongs. By means of the web service, these textual XML notifications are accordingly converted into binary XML notifications and vice versa. In particular, the service bridge may pack and unpack web service notifications in accordance with the SOAP protocol and forward them to embedded services or web services based on an appropriate conversion.

The linking of requests and responses from web services with data inputs and data outputs of embedded services may be achieved, for example, via a WSDL document. This document, which is made available by the service bridge, describes for a corresponding web service the expected request and the responses based on it, which are linked in the service bridge with a corresponding data input of a service and a corresponding data output of a service. Thus the corresponding chain of services from the service at which the data input takes place, to the service at which the data output takes place is further specified in the bridge. The link may be optimized in an appropriate manner, as described further above with reference to FIG. 1 to FIG. 3. In a further embodiment the WSDL document does not need to be already available in the service bridge, but is generated only if necessary, i.e. if the web service is accordingly addressed via a URI.

Figure 5:
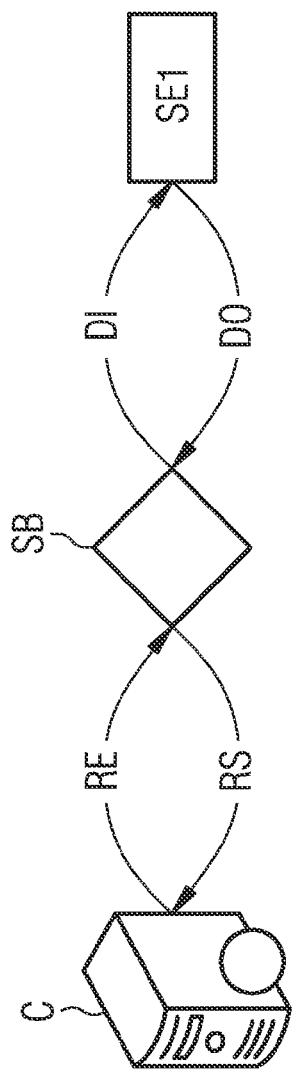
FIG. 5 to FIG. 8 show various characteristics of the method for communication between a first and a second service according to various embodiments.
Figure 6:
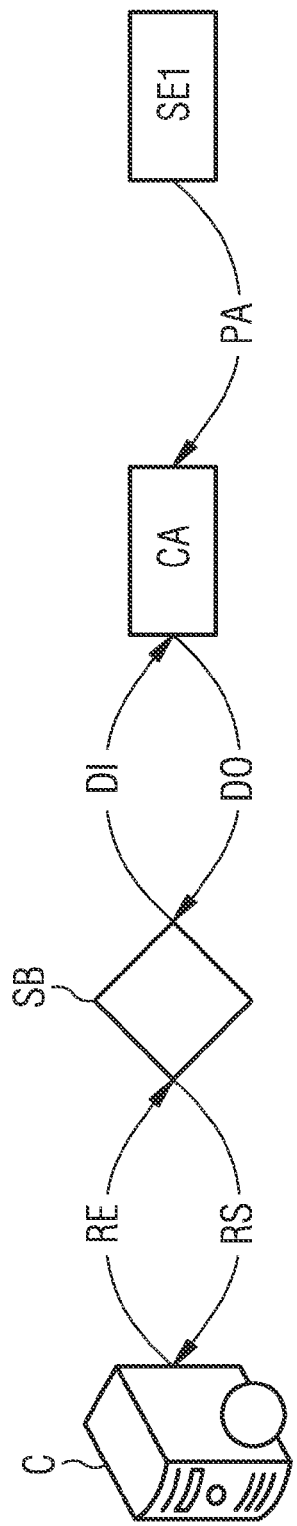

In a further embodiment access to embedded services via web services according to the above variants a) and b) may be restricted to specific services. Furthermore a web service request may possibly be compiled from data outputs of a plurality of embedded services on the service bridge and/or one or more parts of web service responses may be associated with one or more respective data inputs of embedded services. Communication scenarios of the service bridge SB with web services and embedded services are described below for clarification purposes on the basis of FIG. 5 to FIG. 8. FIG. 5 and FIG. 6 show exemplary embodiments of variants a) and b) described above, whereas FIG. 7 and FIG. 8 illustrate further variants of an communication. In the scenarios shown in FIG. 5 to FIG. 8, all notifications exchanged on the left of the service bridge SB, represented by a lozenge, are SOAP notifications (SOAP=Simple Object Access Protocol), whereas all notifications on the right of the service bridge SB are specified as data inputs or data outputs according to the second protocol of the data-driven architecture. These notifications of the second protocol are constructed in such a way that the notification specifies firstly whether it relates to a data input or a data output, and, secondly, with which service the data input or data output is associated.

In the variant according to FIG. 5 the client C sends a web service request RE to a web service running on the service bridge SB. This request is forwarded as a corresponding data input DI to the embedded service SE1, whereupon the embedded service SE1 generates a data output DO at its output, which is converted via the service bridge SB into a response notification RS of the web service. Thus, according to the variant shown in FIG. 5, incoming web service requests are translated into data inputs in the data-driven architecture DA. These web service requests are suspended until the requested data arrives at the service bridge. When the data arrives the suspended request notification RE is reactivated and a suitable web service response notification RS is generated, which is then transferred to the client C. From the perspective of the client the embedded service SE1 behaves like a pullable web service.

In the scenario shown in FIG. 6 an interim storage in the form of a cache CA is used. Stored data is called via the cache, particularly in cases where embedded services cannot be triggered, for example in order to deliver measurement values. In the scenario shown in FIG. 6 a request notification RE of a client C is in turn sent to the service bridge SB. The request notification RE is reset in the service bridge SB and a data input DI corresponding to the request is generated, which is no longer sent directly to the embedded service SE1 but to the cache CA in which data of the embedded service SE1 is buffered. This data is transferred from the embedded service SE1 to the cache CA during periodic updates PA. The data input DI to the cache in turn triggers a data output DO, according to which the correspondingly buffered data of the embedded service SE1 is transferred to the service bridge SB. In order to guarantee short response times for the client C, the cache is made available as a separate embedded service which stores the latest measurement value provided by the embedded service SE1. In this way the cache can be addressed in a similar way to the embedded service SE1 according to the variant shown in FIG. 5.

Figure 7:
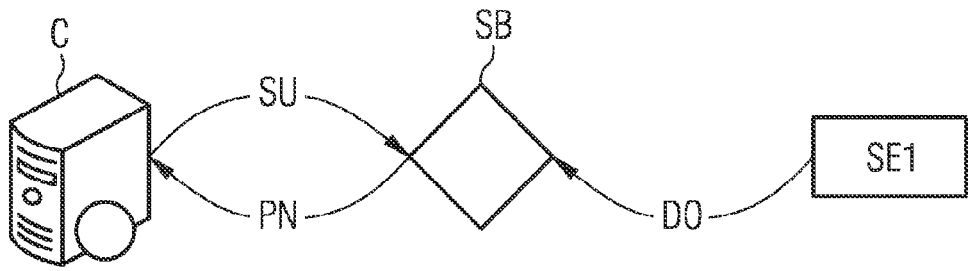

FIG. 7 shows a scenario in which data of an embedded service SE1 is periodically called by a client C. This client subscribes to the data it requires which is provided to the corresponding embedded service SE1, via a subscription SU on a web service of the service bridge. The subscription may be implemented, for example, by means of WS-Eventing (Web Services Eventing), a technique which is sufficiently known from the prior art. This WS-Eventing is a special subscription method of the standard web service. The data generated by the embedded service SE1 is transferred to the service bridge SB via data outputs DO in the form of periodic data deliveries. The data is converted at the service bridge SB into periodic notifications PN (e.g. WS-Eventing notifications) and forwarded to the client C.

Figure 8:
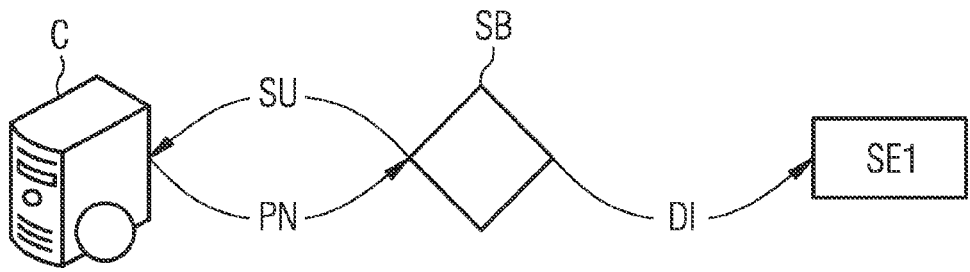

In the scenario shown in FIG. 8, data is periodically delivered to the embedded service SE1. The service bridge SB here subscribes via a corresponding subscription SU to a web service of an external data source of a client C, for example again using WS-Eventing as described above. On the basis of this subscription, periodic notifications PN regarding the data of the external data source are delivered to the service bridge SB, which converts these notifications into a corresponding notification format in the data-driven architecture DA and sends them to the embedded service SE1 as data inputs DI in the form of periodic data transmissions.

A specific implementation of a data-driven architecture in the form of a system for controlling blinds is described below on the basis of FIG. 9 to FIG. 11, wherein this architecture may be appropriately addressed via a service bridge by means of a web service. The boxes in FIG. 9 here represent embedded services designated respectively with reference labels SE1 to SE9. The services outlined in bold, SE1 and SE2, are so-called virtual services which are stored on the service bridge SB and serve as placeholders for web service interactions in a service-oriented architecture. The virtual service SE1 is associated with a user input web service, wherein a request to the web service is converted by the service bridge into a data input of the service SE1, which generates from it a corresponding data output of the virtual user input service SE1. In contrast, the virtual service SE2 is an output service from whose data output in the service bridge the corresponding response to the user input web service is generated. The further services shown in FIG. 9 do not need to be implemented in the service bridge and have the following functions:

SE3=Wind sensor
SE4=Brightness sensor
SE5=Stop sensor (top)
SE6=Stop sensor (bottom)
SE7=Prioritization
SE8=Control logic
SE9=Motor.

A blind control is achieved through the services described above, which control a motor for raising and lowering a blind based on a user input or on the data of a wind sensor or a brightness sensor taking into account an appropriate prioritization of the data by means of a control logic, wherein the uppermost position of the blind is determined via a corresponding stop sensor (top) and the lowest position of the blind is determined via a corresponding stop sensor (bottom), whereupon the stopping of the blind is triggered. In the network of services shown in FIG. 9, an interaction by the services is processed within a service chain, which runs from right to left.

In response to a user input of the service SE1 specifying a desired position for the blind, an output is generated via the output service SE2 which communicates the position at which the blind is actually located after the processing of the service chain. The services SE1 and SE2 described above should be available from the internet via an associated web service, in order—for example—to facilitate remote monitoring via a mobile telephone. Based on the fact that a required position of the blind as specified by a user can be overwritten by a wind sensor according to the service SE3, the final position of the blind should be communicated via the output service SE2 as the response to user inputs.

Figure 9:
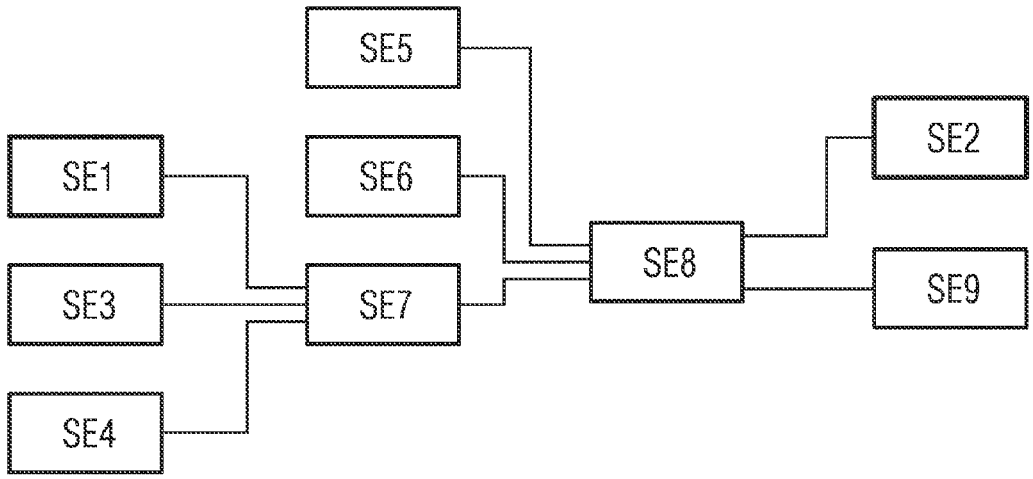
FIG. 9 is a schematic illustration of an exemplary scenario based on a system for controlling blinds, in which second services are executed by means of a service chain.

FIG. 10 shows how, based on the data-driven services SE1 and SE2 shown in FIG. 9, an appropriate WSDL document can be generated for use by a web service, which is associated with the services SE1 and SE2. The blocks SD1 or SD2 here represent the corresponding service description of the service SE1 relating to the user input or of the service SE2 relating to the output. According to the service description SD1, based on a data input at the service input a data output which reflects the desired blind position is generated in the form of a parameter in float format. According to the service description SD2, based on a data input at the service SE2 input a data output, which reflects the actual position of the blind, is generated in the form of a parameter in float format.

The service descriptions SD1 and SD2 are linked with the WSDL document D, from which only the parts relevant for the various embodiments are indicated and which contain a XML scheme definition of two types, T1 and T2, in the upper part. Type T1 here represents the request to a web service and is designated with the element name "UserInputRequest". Type T2 specifies a response of the web service and is designated with the element name "OutputResponse". Further down in the WSDL document D are located the definitions of corresponding notifications ME1 and ME2, wherein the notification ME1 corresponds to the request of the web service in the form of the blind position to be set and is designated "SetPositionInput". In contrast the notification ME2 corresponds to the response of the web service in the form of the actual blind position and is called "SetPositionOutput". The corresponding addresses in the form of URI indicators to which the notifications are to be sent are appended to the definitions of the notifications ME1 and ME2. These addresses are not shown in FIG. 10.

In the service bridge a corresponding request of the web service is converted into a data input of the service SE1 and a data output of the service SE2 is converted into a corresponding response of the web service. The WSDL document here specifies an individual communication terminal for an interaction with the embedded services, which—as shown in FIG. 9—are linked to one another. This allows data from different embedded services to be received and sent at different positions in a corresponding chain. The requests and responses of the web service, which are connected with corresponding data inputs or data inputs at the beginning or end of the chain of services, are here defined via the WSDL document. The WSDL document may be generated in advance based on the chains of embedded services specified in the second protocol, wherein a URI is generated for addressing the service chain as soon as the service chain is instantiated. A URI may also possibly be generated without instantiation, in which case the instantiation is carried out as soon as the URI is addressed by a web service.

On the basis of FIG. 11, the way in which incoming notifications of the web service specified via the WSDL document are converted into data inputs of the embedded SE1, or the way in which data outputs of the embedded service SE2 are converted into corresponding responses of the web service, is described below. The block RE here represents a request to the web service in the form of a required blind position "targetPosition" at 1.0. This request is represented via a textual XML document which is designated as D1. This textual SOAP notification is then converted into a so-called binary EXI representation for use in the data-driven architecture of the embedded services (EXI=Efficient XML Interchange). In this way, with the help of the EXI-coded SOAP notification, the corresponding data input is then generated for the service SE1, which is designated as DI. This data input also contains, alongside the EXI-coded SOAP notification, the specification of the service SE1 (for example in the form of a service identifier) as well as the information that it is a data input.

The notification DI is then further processed in the chain of embedded services, which is represented in FIG. 9 and designated in FIG. 11 as SK. The service chain is here addressed by the URI already mentioned above. For example, the data input DI is addressed to all services which consume data that is produced by the virtual service of the user input SE1. In the above example of the blind control this is the service SE3, which describes a prioritization between the outputs of the services SE1, SE3 and SE4. After running through the service chain a data output DO is finally generated, which has the same format as the data input DI and is output from the virtual service SE2. This data output DO in turn contains an EXI-coded SOAP notification as well as the designation of the service SE2 and the information that it is a data output. This notification DO is then in turn converted in the service bridge into a corresponding response RS of the web service, which causes the EXI-coded SOAP notification which is contained in the data output DO to be converted into the textual XML document D2, which specifies the Position 1.0 as the final position "finalPosition" of the blind. The SOAP notification according to the document D2 is then sent to the web service as the response RS.

The request/response interactions described above require a mapping of SOAP notifications and triggered notifications or interactions to be stored in the data-driven architecture, so that notifications that come from one of the embedded services of the service chain can be associated with the correct waiting web service request. The web service terminal, which is defined by the WSDL document D described above and which can be addressed as URI or even as URL (URL=Universal Resource Locator), identifies a unique interaction, for example based on the destination end point of the SOAP notification. This enables the service bridge to identify which service of the service chain is involved in the interaction.

As may be seen from the above description, the method according to various embodiments enables an appropriate communication between services of a service-oriented architecture, which is defined by request-response mechanisms, to be achieved in a data-driven architecture, which is specified by data inputs and data outputs of services and the forwarding of data between the services.

What is claimed is:

1. A computer-implemented method for communicating between a number of first services and a number of second services, wherein the number of first services belongs to a service-oriented architecture, in which a respective first service is provided via notifications based on a request-response mechanism by means of a first protocol, wherein the number of second services belongs to a data-driven architecture, in which second services can be interconnected by means of a second protocol, wherein the second protocol specifies data inputs and data outputs of the second services and the forwarding of data between the second services, the method comprising:

a processor of a service converter receiving an inbound textual XML notification of a particular first service and converting the notification of the particular first service into a binary XML data input of a particular second service associated with the particular first service; and the processor of the service converter receiving a binary XML data output of the particular second service and converting the data output of the particular second service into an outbound textual XML notification outgoing from the service converter to the particular first service associated with the particular second service;

such that the service converter provides a bi-directional XML conversion and communication between the particular first service of the service-oriented architecture and the particular second service of the data-driven architecture; and wherein the second services belonging to the data-driven architecture comprise at least one service embedded in the service converter and at least one service embedded in a networked device external to the service converter.

2. The method according to claim 1, wherein the particular first service comprises a web service of the service-oriented architecture, such that the service converter provides a bi-directional communication between the web service of the service-oriented architecture and the particular second service of the data-driven architecture.

3. The method according to claim 1, wherein the number of second services in a network are distributed services, wherein at least some of the services in the network are interconnected by means of one or more service chains specified via the second protocol.

4. The method according to claim 1, wherein a notification of a first service incoming into the service converter in the form of a request notification to the first service is converted into a data input of a second service, which is associated with the first service, and then a data output of the second service or of a further second service, which is also associated with the first service and is interconnected with the second service, is converted into a notification of the first service outgoing from the service converter in the form of a response notification to the request notification.

5. The method according to claim 1, wherein one or more data outputs of one or more second services are stored in a cache and provided via the cache to the service converter, wherein the data output or outputs can be periodically generated.

6. The method according to claim 5, wherein the cache is implemented as a second service in which data outputs cached via data inputs may be called.

7. The method according to claim 1, wherein a first service is specified in the service converter in a description language for first services, in particular in a WSDL document, said document being processed in the service converter such that one or more data inputs from one or more second services are generated from one or more of the request notifications to the first service specified in the document, and one or more response notifications of the first service, specified in the document are generated from one or more data outputs of one or more second services.

8. The method according to claim 1, wherein a data output of a second service incoming into the service converter is converted into a notification of a first service associated with the second service outgoing from the service converter in the form of a request notification to the first service.

9. The method according to claim 8, wherein the incoming response notification from the first service to the request notification is converted by the service converter into a data input of the second service.

10. The method according to claim 1, wherein a first service subscribes to predefined data outputs of a second service, wherein a predefined data output of the second service incoming into the service converter is converted into a notification of the first service outgoing from the service converter.

11. The method according to claim 1, wherein a notification of a first service, incoming into the service converter in the form of a response notification of the first service, which was sent in response to a request notification previously output to the first service by the service converter, is converted into a data input of a second service associated with the first service.

12. The method according to claim 1, wherein the service converter subscribes to predefined notifications of a first service, wherein a predefined notification of the first service incoming into the service converter is converted in the service converter into a data input of a second service associated with the first service.

13. The method according to claim 1, wherein the first services belonging to the service-oriented architecture comprise at least one service embedded in the service converter.

14. The method according to claim 1, wherein the binary XML data input and binary XML data output of the particular second service comprise binary EXI (Efficient XML Interchange) representations usable by the particular second service.

15. A service converter for communication between a number of first services and a number of second services, wherein the number of first services belongs to a service-oriented architecture, in which a respective first service is provided via notifications based on a request-response mechanism by means of a first protocol, and wherein the number of second services belongs to a data-driven architecture, in which second services can be interconnected by means of a second protocol, wherein the second protocol specifies data inputs and data outputs of the second services and the forwarding of data between the second services, wherein the service converter comprises:
  a first conversion means for converting an inbound textual XML notification of a particular first service incoming into the service converter into a binary XML data input of a particular second service associated with the particular first service; and
  a second conversion means for converting a binary XML data output of the particular second service incoming into the service converter into an outbound textual XML notification of the particular first service associated with the particular second service outgoing from the service converter;
  such that the service converter provides a bi-directional XML conversion and communication between the particular first service of the service-oriented architecture and the particular second service of the data-driven architecture; and
  wherein the second services belonging to the data-driven architecture comprise at least one service embedded in the service converter and at least one service embedded in a networked device external to the service converter.

16. The service converter according to claim 15, wherein the particular first service comprises a web service of the service-oriented architecture, such that the service converter is configured to provide a bi-directional communication between the web service of the service-oriented architecture and the particular second service of the data-driven architecture.

17. The service converter according to claim 15, which is designed such that the number of second services in a network are distributed services, wherein at least some of the services in the network are interconnected by means of one or more service chains specified via the second protocol.

18. The service converter according to claim 15, which is designed such that a notification of a first service incoming into the service converter in the form of a request notification to the first service is converted into a data input of a second service, which is associated with the first service, and then a data output of the second service or of a further second service, which is also associated with the first service and is interconnected with the second service, is converted into a notification of the first service outgoing from the service converter in the form of a response notification to the request notification.

19. The service converter according to claim 15, which is designed such that one or more data outputs of one or more second services are stored in a cache and provided via the cache to the service converter, wherein the data output or outputs can be periodically generated.

20. The service converter according to claim 19, which is designed such that the cache is implemented as a second service in which data outputs cached via data inputs may be called.

21. The service converter according to claim 15, which is designed such that a first service is specified in the service converter in a description language for first services, in particular in a WSDL document, said document being processed in the service converter such that one or more data inputs from one or more second services are generated from one or more of the request notifications to the first service specified in the document, and one or more response notifications of the first service, specified in the document are generated from one or more data outputs of one or more second services.

22. The service converter according to claim 15, which is designed such that a data output of a second service incoming into the service converter is converted into a notification of a first service associated with the second service outgoing from the service converter in the form of a request notification to the first service.

23. The service converter according to claim 22, which is designed such that the incoming response notification from the first service to the request notification is converted by the service converter into a data input of the second service.

24. The service converter according to claim 15, which is designed such that a first service subscribes to predefined data outputs of a second service, wherein a predefined data output of the second service incoming into the service converter is converted into a notification of the first service outgoing from the service converter.

25. The service converter according to claim 15, which is designed such that a notification of a first service, incoming into the service converter in the form of a response notification of the first service, which was sent in response to a request notification previously output to the first service by the service converter, is converted into a data input of a second service associated with the first service.

26. The service converter according to claim 15, which is designed such that the service converter subscribes to predefined notifications of a first service, wherein a predefined notification of the first service incoming into the service converter is converted in the service converter into a data input of a second service associated with the first service.

27. The service converter according to claim 15, wherein the first services belonging to the service-oriented architecture comprise at least one of the first service is implemented embedded in the service converter.

* * * * *